United States Patent
Harris et al.

(10) Patent No.: US 6,816,945 B2
(45) Date of Patent: Nov. 9, 2004

(54) QUIESCE SYSTEM STORAGE DEVICE AND METHOD IN A DUAL ACTIVE CONTROLLER WITH CACHE COHERENCY USING STRIPE LOCKS FOR IMPLIED STORAGE VOLUME RESERVATIONS

(75) Inventors: Kenneth Michael Harris, Lafayette, CO (US); Kevin Lee Kidney, Lafeyette, CO (US); Brian Dennis McKean, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 09/922,430

(22) Filed: Aug. 3, 2001

(65) Prior Publication Data

US 2003/0037071 A1 Feb. 20, 2003

(51) Int. Cl.[7] .............................................. G06F 12/00
(52) U.S. Cl. ...................................... 711/135; 711/145
(58) Field of Search .............................. 711/135, 137, 711/162, 165, 144, 145; 714/6

(56) References Cited

U.S. PATENT DOCUMENTS

| 5,414,827 A | * | 5/1995 | Lin ............................ 711/135 |
| 5,860,105 A | | 1/1999 | McDermott et al. ......... 711/135 |
| 6,115,791 A | | 9/2000 | Collins et al. ............... 711/122 |
| 6,205,521 B1 | * | 3/2001 | Schumann ................... 711/144 |
| 6,304,980 B1 | * | 10/2001 | Beardsley et al. ............. 714/6 |
| 6,578,120 B1 | * | 6/2003 | Crockett et al. ............... 714/6 |

* cited by examiner

Primary Examiner—Pierre Bataille
(74) Attorney, Agent, or Firm—David W. Lynch; Arthur J. Samodovitz

(57) ABSTRACT

A method and apparatus for quiescing a system storage device wherein cache lines associated with a system storage device to be quiesced are flushed using a stripe lock mechanism to find and flush cache data associated with the given system storage device. Dirty cache lines are associated with a stripe lock, and that stripe lock will be in the active state or the clearing state. The stripe locks are also maintained on a linked list per a system storage device. In the normal life cycle of a stripe lock, if the partner controller requests a lock over part of the extent of an active lock, the active lock will go to the clearing state. Data in the extent of the now clearing lock is flushed. For performing a quiesce, stripe locks for the given system storage device are set to clearing on a plurality of controllers, thus causing the flush. The quiesce mechanism then only needs to wait until stripe locks have been cleared for the system storage device.

4 Claims, 7 Drawing Sheets

200

| Owner | ID | Lock Type | | | Extent | | | Use Count | Pending Locks | IOP List | State | Lock Wait Count |
|---|---|---|---|---|---|---|---|---|---|---|---|---|
| | | Lock | Block | Full | Storage Volume | Start Sector | num Sector | | | | | |
| A | 10 | 1 | 0 | 0 | 0 | 10 | 12 | N | Lock1, ... Lock3 | IOP1, ..., IOPN | Lock Active | 0 |

212 / 210 / 214 / 220 / 222 / 230 / 232 / 240 / 242

250  254  256    258    260  252

| 210 | 212 | 214 Lock Type | | | 220 Extent | | | 222 Use Count | 230 Pending Locks | 232 IOP List | 240 State | 242 Lock Wait Count |
|---|---|---|---|---|---|---|---|---|---|---|---|---|
| ID | Owner | Lock Block | Full | Storage Volume | Start Sector | num Sector | | | | | |
| 10 | A | 1 | 0 | 0 | 10 | 12 | N | Lock1, ... Lock3 | IOP1, ... IOPN | Lock Active | 0 |

250 — Storage Volume: 0
254 — Start Sector: 10
256 — num Sector: 12
258 — Pending Locks: Lock1, ... Lock3
260 — IOP List: IOP1, ... IOPN
252 — State: Lock Active

QUIESCE SYSTEM STORAGE DEVICE AND METHOD IN A DUAL ACTIVE CONTROLLER WITH CACHE COHERENCY USING STRIPE LOCKS FOR IMPLIED STORAGE VOLUME RESERVATIONS

BACKGROUND OF THE INVENTION

1. Field of the Invention

This invention relates in general to computer storage systems, and more particularly to a quiesce system storage device and method in a dual active controller with cache coherency using stripe locks for implied storage volume reservations.

2. Description of Related Art

Increasingly, there is a need to provide access to stored information or data on hard disk drives (or other storage devices) from a plurality of host servers and to also permit the data stored on any particular storage device to be accessed through alternative device controllers. Providing access to the data from multiple hosts eliminates the need to store the data at more than one location (though the data may still be redundantly stored using known mirroring or Redundant Array of Independent Disk (RAID) techniques) and in theory assures that the identical data can be accessed by interested parties. Providing multiple access to a storage device through a plurality of controllers, provides redundant access to the device from an alternate (or second) controller so that the data remains accessible in the event that the first controller fails.

Although providing access to storage devices through multiple controllers is desirable, such a configuration may present data consistency problems. Data consistency refers to all controllers providing visibility to one identical copy of the data. Data consistency can be provided through data synchronization or data coherency or both. Data coherency refers to maintaining a consistent copy of the data in each of the controllers caches. Data synchronization refers to keeping the data in the storage controller's cache the same as that in the storage device.

Storage controllers direct data traffic from the host system to one or more non-volatile storage devices. Storage controller may or may not have an intermediary cache to stage data between the non-volatile storage device and the host system. A caching controller (or caching storage controller) is a device which is capable of directing the data traffic from a host system to one or more non-volatile storage devices which uses an intermediary data storage device (the cache memory) to stage data between the non-volatile storage device and the host system. In general, the intermediary storage device is built out of RAM to allow a quicker access time to the data. Multiple active controllers are defined as a collection of storage controllers or caching storage controllers which work in a cooperative manner with each other.

Multiple active controllers provide the ability for recovering from a controller failure by allowing multiple paths to a storage volume. The storage volume is a contiguous range of randomly accessible sector of data. For practical purposes, the sector numbering starts at 0 and goes to N, where N is the total number of sectors available to the host system. A data extent is a range of data within a storage volume delineated by a starting sector and an ending sector. The storage volume is broken up into a number of data extents which are not required to be of equivalent sizes, but may not overlap. These concepts are used in the discussion of the background and the detailed description of embodiments of the invention, and apply to both.

Caching storage controllers that work independently of one another to store information or data to a secondary storage unit, such as a hard disk drive, or tape unit, are conventionally available. There are also caching storage controllers that work with one or more other controller(s) to provide multiple controller access to a secondary storage unit and provide a fault tolerant environment. If two controllers are simultaneously providing access to a common set of storage devices and each is able to take over the other's functionality in the event of a failure, then those controllers are referred to as active-active or dual-active controllers.

Computer system configurations involving one or more host computers and having two or more controllers that use cache technologies, with access to a storage device through any of the controllers, should desirably provide some mechanism of ensuring that the cache data in each controller is always correct. Unfortunately in conventional systems they may not. Controllers using the SCSI command set could use two commands that are provided in that command set, the "Reserve LUN" and "Release LUN" commands, where LUN is an abbreviation for Logical Unit Number. (SCSI commands, including the Reserve LUN and Release LUN commands, are described in standard references including SCSI-2 Small Computer System lnterface-2 ANSI X3.131:1994: which is incorporated herein by reference.) The host computer, especially one operating in a cluster environment, could use these two commands to reserve all accesses to the entire LUN.

Unfortunately, not all host computers use these SCSI commands. Furthermore, the Reserve LUN and Release LUN commands do not provide for reservation of a portion of a storage volume because they apply to the entire storage volume.

In addition, there are problems with data synchronization between controllers which maintain local cached copies of data. For example, one set of host transactions could cause data integrity problems (data consistency and data synchronization problems). The data consistency problem is brought about by the fact that each controller's cache operates independently.

One technique for overcoming the data consistency problems involves a storage volume reservation system and method as described in co-pending U.S. patent application Ser. No. 09/325,033, which is hereby incorporated by reference. The storage volume (or storage LUN) reservation system for active controllers in an environment allows data access through two or more separate caching controllers. The inventive structure and method maintains a "reservation table" (such as a LUN reservation table) that is always consistent on each of the plurality of controllers. This structure and method also provide the capability of explicitly reserving storage volumes using any current storage volume (or LUN) reserve commands, or implicitly using a write operation. The inventive structure and method also provide the capability of invalidating a controller's cache based on acquiring new reservation.

The storage volume reservation system and method provide that each controller is not required to reserve a storage volume in order to perform an update to that storage volume. An explicit reservation may be made through the use of Storage Volume Reserve commands, while an implicit reservation is made whenever a write operation requires that the particular controller obtain a reservation. Implicit reservations may occur for example when an alternate controller already owns the reservation. The reservation may also be obtained implicitly when the controller is required to perform a read operation, and the alternate controller already owns the reservation. This reservation requirement is imposed in order to ensure that the alternate controller's cache contains no data (dirty data) that has not been synchronized with the storage volume drive.

The reservation process is synchronized between all of the controllers in the system in order to maintain reservation table coherency. All updates to the reservation table are propagated to the alternate controllers to maintain reservation table coherency. This procedure allows most reads and writes to be performed with minimal overhead. An I/O operation to a storage volume that is reserved by that controller only needs to check for that ownership before processing the I/O operation request.

The reservation process also benefits from cache flushing and cache invalidating in some circumstances to maintain data integrity. Obtaining a reservation to a storage volume or portion thereof that is not owned by any controller is straightforward and only requires an update to the reservation table, and it's propagation to all alternate controllers. Obtaining a reservation to a storage volume or portion thereof currently owned by an alternate active controller further requires that the alternate controller flush and invalidate all cache data associated with that storage volume. Releasing a reservation is not required but may optionally be performed using storage volume release command.

Sometimes it is necessary to stop all processes associated with a system storage device. A system storage device quiesce is the process of stopping all activity for a given system storage device and release all resources used by that system storage device. For example, a storage device may need to be quiesced when "timeout" or "disk not responding" errors are returned due to overheating or failure of the disk.

To perform a quiesce on both controllers of a dual active pair while maintaining data integrity, and without requiring the operator to start the process, all IO from the host to the system storage device must be stopped. The controller will return busy to all IO requests for the system storage device. Next, a check to determine that no rebuilds, parity checks, or initializations are active for the system storage device is performed. If any are active, the system storage device cannot be quiesced. The firmware must then wait for all active IO to complete for this system storage device. After all active IO has completed, all dirty cache lines to the disk must be flushed for this system storage device. Next, all data is invalidated in the cache for this system storage device. Data in the mirror cache for this system storage device is also invalidated. Finally, the firmware must wait for the other controller of the dual active pair to finish these activities. All other system storage devices are allowed to continue to process IO.

However, this process presents a problem in determining how to find and flush dirty cache data belonging to a specific system storage device. Up to now, all of cache is scanned to look for any link that is associated with the given system storage device and the identified lines are scheduled to be flushed. Then, the quiesce mechanism must scan again to see if the flush has completed. This process is continued until all dirty cache data belonging to the storage device has been flushed to disk.

This approach requires a large amount of time to scan a large cache because there may be thousands of cache lines. A quiesce of a system storage device must be able to be initiated and finished during vendor unique command processing.

It can be seen that there is a need for a quiesce system storage device and method in a dual active controller with cache coherency using stripe locks for implied storage volume reservations.

SUMMARY OF THE INVENTION

To overcome the limitations in the prior art described above, and to overcome other limitations that will become apparent upon reading and understanding the present specification, the present invention discloses a quiesce system storage device and method in a dual active controller with cache coherency using stripe locks for implied storage volume reservations.

The present invention solves the above-described problems by using a stripe lock mechanism to find and flush cache data associated with the given system storage device. Dirty cache lines are associated with a stripe lock, and that stripe lock will be in the active state or the clearing state.

A method in accordance with the principles of the present invention includes associating dirty cache lines with a stripe lock, the stripe lock representing cache lines within data extents that are part of a system storage device associated with the dirty cache lines, maintaining the stripe locks on a linked list for the system storage device, setting stripe locks for the system storage device to be quiesced to a clearing state and flushing cache lines associated with the system storage device to be quiesced that are set for clearing.

Other embodiments of a method in accordance with the principles of the invention may include alternative or optional additional aspects. One such aspect of the present invention is the method further includes determining whether cache lines associated with the system storage device have been flushed by analyzing whether the stripe lock linked list is empty, halting the system storage device when cache lines associated with the system storage device have been flushed and examining the stripe lock linked list and continuing to flush cache lines set for clearing until the stripe lock linked list is empty.

In another embodiment of the present invention, a method for quiescing a system storage device is disclosed. The method for quiescing a system storage device includes stopping IO from a host to a system storage device that is to be quiesced, checking the system storage device to determine that no rebuilds, parity checks, or initializations are active, wait for active IO to complete for the system storage device to be quiesced, after active IO has completed for the system storage device to be quiesced, flushing dirty cache lines to the system storage device, invalidating data in the cache for the system storage device to be quiesced, invalidating data in the mirror cache for the system storage device to be quiesced and repeating the above steps for controllers, wherein the flushing cache lines associated with a storage device to be quiesced, further includes associating dirty cache lines with a stripe lock, the stripe lock representing cache lines within data extents that are part of a system storage device associated with the dirty cache lines, maintaining the stripe locks on a linked list for the system storage device, setting stripe locks for the system storage device to be quiesced to a clearing state and flushing cache lines associated with the system storage device to be quiesced that are set for clearing.

Another aspect of the present invention is that the method further includes continuing to process IO for other system storage devices.

Another aspect of the present invention is that the method further includes determining whether cache lines associated with the system storage device have been flushed by analyzing whether the stripe lock linked list is empty, halting the system storage device when cache lines associated with the system storage device have been flushed and examining the stripe lock linked list and continuing to flush cache lines set for clearing until the stripe lock linked list is empty.

In another embodiment of the present invention, an article of manufacture comprising a program storage medium readable by a computer tangibly embodying one or more programs of instructions executable by the computer. The program performing a method for flushing cache lines associated with a storage device to be quiesced, wherein the method includes associating dirty cache lines with a stripe lock, the stripe lock representing cache lines within data extents that are part of a system storage device associated with the dirty cache lines, maintaining the stripe locks on a linked list for the system storage device, setting stripe locks for the system storage device to be quiesced to a clearing state and flushing cache lines associated with the system storage device to be quiesced that are set for clearing.

Another aspect of the present invention is that the article of manufacture further includes determining whether cache lines associated with the system storage device have been flushed by analyzing whether the stripe lock linked list is empty, halting the system storage device when cache lines associated with the system storage device have been flushed and examining the stripe lock linked list and continuing to flush cache lines set for clearing until the stripe lock linked list is empty.

In another embodiment of the present invention, a storage system is disclosed. The storage system includes a plurality of caching storage controllers and a plurality of storage devices coupled to the plurality of storage controllers, wherein the caching storage controllers are configured to flush cache lines within the storage controllers that are associated with a storage device to be quiesced, the caching storage controllers associating dirty cache lines with a stripe lock within the memory of the caching storage controllers, the stripe lock representing cache lines within data extents of a system storage device associated with the dirty cache lines, maintaining the stripe locks on a linked list for the system storage device, setting stripe locks for the system storage device to be quiesced to a clearing state and flushing cache lines set for clearing within the caching storage controllers that are associated with the system storage device to be quiesced.

Another aspect of the storage system of the present invention is that the storage controllers determine whether cache lines within the caching storage controllers associated with the system storage device have been flushed by analyzing whether the stripe lock linked list is empty, halt the system storage device when cache lines associated with the system storage device have been flushed and examine the stripe lock linked list and continuing to flush cache lines set for clearing until the stripe lock linked list is empty.

Another aspect of the storage system of the present invention is that the memory of the storage controllers further comprises a plurality of stripe lock records.

Another aspect of the storage system of the present invention is that the stripe lock records comprise an ownership field, a lock type field, an extent field, a use count field, a linked list of pending locks, a linked list of input/output processes (iop)s, a state field, and a lock wait count field.

Another aspect of the storage system of the present invention is that stripe lock records are maintain in storage separate from the controllers.

Another aspect of the storage system of the present invention is that the memory of each controller further comprises a storage volume ownership transaction data structure for tracking transactions between the controllers.

Another aspect of the storage system of the present invention is that the memory of each controller further comprises a lock request data structure for establishing a lock on a storage volume.

In another embodiment of the present invention, a storage controller is disclosed. The storage controller includes an input/output interface for permitting communication with a host computer and a mass storage system, a cache having a number of cache lines, some of which cache lines may include dirty data, a memory for maintaining a stripe lock and a processor, coupled to the memory and cache, the processor associating dirty cache lines with the stripe lock maintained within the memory, the stripe lock representing cache lines within data extents of a system storage device associated with the dirty cache lines, the processor maintaining the stripe locks on a linked list for the system storage device in the memory, setting stripe locks for the system storage device to be quiesced to a clearing state and flushing cache lines set for clearing that are associated with the system storage device to be quiesced.

Another aspect of the storage controller of the present invention is that the processor determines whether cache lines associated with the system storage device have been flushed by analyzing whether the stripe lock linked list is empty, halts the system storage device when cache lines associated with the system storage device have been flushed and examines the stripe lock linked list and continuing to flush cache lines set for clearing until the stripe lock linked list is empty.

Another aspect of the storage controller of the present invention is that the memory further comprises a plurality of stripe lock records.

Another aspect of the storage controller of the present invention is that the stripe lock records comprise an ownership field, a lock type field, an extent field, a use count field, a linked list of pending locks, a linked list of input/output processes (iop)s, a state field, and a lock wait count field.

Another aspect of the storage controller of the present invention is that stripe lock records are maintain in storage separate from the storage controller.

Another aspect of the storage controller of the present invention is that the memory further comprises a storage volume ownership transaction data structure for tracking transactions with other storage controllers.

Another aspect of the storage controller of the present invention is that the memory further comprises a lock request data structure for establishing a lock on a storage volume.

Another embodiment of a storage controller includes means for communicating with a host computer and a mass storage system, first memory means having a number of cache lines, some of which cache lines may include dirty data, second memory means for maintaining a stripe lock and means, coupled to the memory and cache, for associating dirty cache lines with the stripe lock maintained within the memory, the stripe lock representing cache lines within data extents of a system storage device associated with the dirty cache lines, for maintaining the stripe locks on a linked list for the system storage device in the memory, for setting stripe locks for the system storage device to be quiesced to a clearing state and for flushing cache lines set for clearing that are associated with the system storage device to be quiesced.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates a stripe lock array of Stripe Lock Records (SLR) for a Storage Volume Reservation system;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention uses a stripe lock mechanism to find and flush cache data associated with the given system storage device. Dirty cache lines are associated with a stripe lock, and that stripe lock will be in the active state or the clearing state. The stripe locks are also maintained on a linked list per a system storage device. In the normal life cycle of a stripe lock, if the partner controller requests a lock over part of the extent of an active lock, the active lock will go to the clearing state. This causes data in the extent of the now clearing lock to be flushed. For performing a quiesce, stripe locks for the given system storage device are set to clearing on both controllers, thus causing the flush. The quiesce mechanism then only needs to wait until stripe locks have been cleared for the system storage device.

Figure 1:
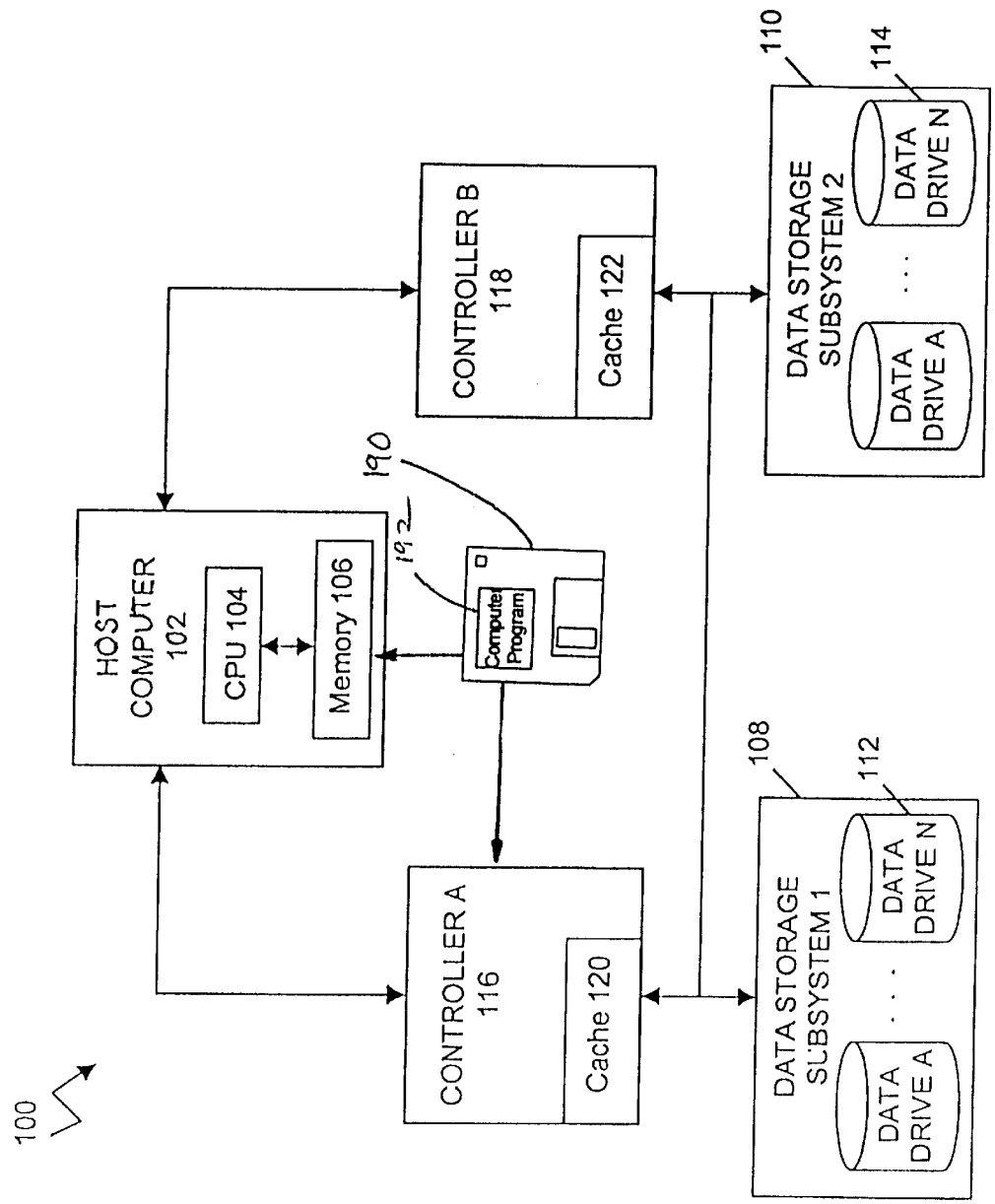
FIG. 1 illustrates a computer storage system according to the present invention.

FIG. 1 illustrates a computer storage system 100 according to the present invention. In FIG. 1, the computer storage system 100 includes a host computer 102 with a processor 104 and associated memory 106, one or more data storage subsystems 108, 110 each having a plurality of storage devices 112, 114, first and second storage controllers 116, 118 coupled between the host computer 102 and the storage subsystem 108, 110 by interfaces and communications links of conventional type, such as for example, busses or network connections. When the first and second controllers 116, 118 are caching storage controllers (described below), each controller includes a cache memory 120, 122 that serves as intermediate storage. Usually the cache memory is fast random access memory (RAM) of which there are many types.

FIG. 2 illustrates a stripe lock array of Stripe Lock Records (SLR) 200 for a Storage Volume Reservation system. The stripe array of SLRs 200 is a data structure defined in a memory of each controller for the embodiment now described. (Other embodiments of the inventive structure and method may provide for Stripe Lock Array(s) that exist in location(s) separate from the controllers.) The layout or configuration of this data structure may be identical for each controller, but the actual contents stored within the SLR data structure will typically be specific to each individual controller. Each SLR includes an ID field 210 which functions as an index in the stripe lock array. Each SLR includes the following data fields: an Ownership Field 212, a Lock Type Field 214, an Extent Field 220, a Use Count Field 222, a Linked List of Pending Locks 230, a Linked List of Input/Output Processes (IOP)s 232, a State Field 240, and a Lock Wait Count Field 242.

The Ownership Field 212 specifies either that the controller in which the SLR resides holds a stripe lock for a storage volume, or that another controller holds a stripe lock for the storage volume. The Lock Type Field 214 identifies one of the following data extent lock status: (a) the controller owns a "full lock" of the storage volume, (b) the controller owns one or more number "partial locks" of data extents of the storage volume, or (c) certain data extents of the storage volume are temporarily blocked. The Extent Field 220 includes the storage volume in which the stripe locks exists as well the Initial Block where the stripe lock begins and the Final Block where the stripe lock ends. The Use Count Field 222 tracks the number of any operations working with the stripe lock. The operations include IOPs, write-back cache lines and rebuild operations. The Use Count Field 222 allows the controller to determine when a stripe lock may be released.

The Pending Locks Field 230 is a linked list of lock requests for the stripe lock in question. Once the Use Count Field equals zero, the controller may transfer the stripe lock to the next lock request in the Pending Locks linked list 230. The IOP List Field 232 is a Linked list of IOPs that varies depending on whether a State Field 240 of the stripe lock is active or pending. When the state field 240 indicates that the stripe lock is active, the IOP List 232 includes a list of IOPs using the stripe lock. When the state field 240 indicates that the stripe lock is pending, the IOP List 232 includes a list of IOPs waiting for the lock to be granted. The Lock Wait Count Field 242 is a count of the number of stripe locks a stripe lock request will cover.

The SLR State Field 240 provides a set of six flags which allow a quick check to be made to determine the state of stripe locks for a storage volume. The stripe lock state 240 may be any one of NO_LOCKS (nobody currently owns any locks), PARTIAL_LOCKS (this controller owns pieces of the storage volume, but not the entire storage volume), BLOCK_LOCK (a temporary blocking lock is in place for this storage volume, likely indicating that another controller is performing an operation such as a rebuild or consistency check), LOCAL_RESERVATION (this controller has a SCSI Reserve command outstanding for this storage volume), and REMOTE_RESERVATION (another controller has a SCSI Reserve command outstanding for this storage volume). These flags may advantageously be implemented by setting a single binary bit is a predetermined bit-position to either a first logical state (e.g. "0") or to a different second logical state (e.g. "1").

Referring to FIG. 2, an example of an embodiment of a stripe lock record (SLR) 200 is depicted for a system with one or more storage volumes. Storage Volume 0 250 has partial locks only. The stripe lock is active 252 and spans storage volume blocks 10 254 to 12 256. In addition, the stripe has three pending locks (Lock1 . . . Lock3) 256 and is being utilized by N IOPs (IOP1 . . . IOPN) 260.

Figure 3:
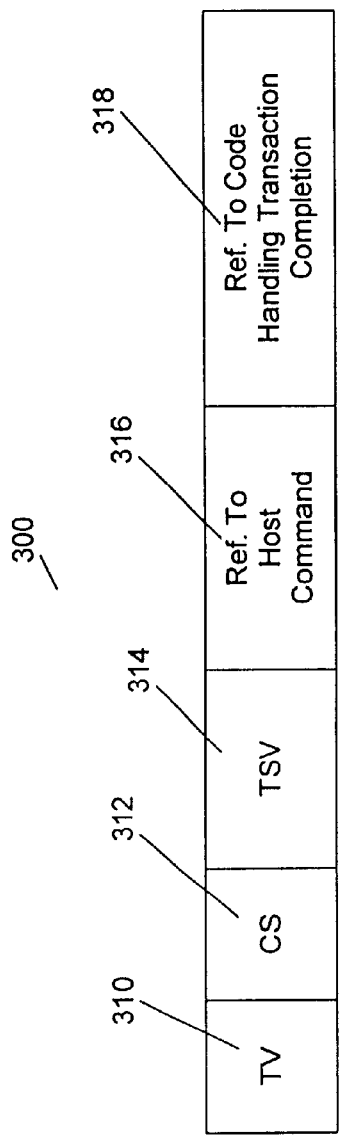
FIG. 3 illustrates the Storage Volume Ownership Transaction (SVOT) data structure.

FIG. 3 illustrates the Storage Volume Ownership Transaction (SVOT) data structure 300. The SVOT 300 is a data structure established in program memory of the controller and tracks the state of a current transaction between the controller in which the data structure is resident and an alternate controller. (The alternate controller also has a storage volume ownership transaction data structure.) A Transaction Value 310, a Current Status 312, a Time Stamp Value 314, a Reference to a Host Command 316, and a Reference to the Code that handles transaction completion 318 are maintained in the Storage Volume Ownership Transaction data structure. The Transaction Value 310 is a unique identifier used to initiate a Storage Volume Ownership Request and to track the corresponding Storage Volume Ownership Response. The Current Status value 312 is a state variable that maintains the current state of the transaction. Current status may take on the values of LOCK_REQUESTED, LOCK_PENDING, LOCK_GRANTED or LOCK_CLEARING. The Time Stamp value 314 is used to mark the time when a transaction started. This starting time is used to track how long a lock request has been active but not yet granted. The SLRs of the stripe lock array are updated when the Storage Volume Ownership Transaction establishes a stripe lock.

The Storage Volume Ownership Request (SVORQ) is a message sent from one controller to another controller requesting a change on SLR of the stripe lock array. The Storage Volume Ownership Request uses the Lock Request Data Structure to contain information to send to another controller to establish a lock.

Figure 4:
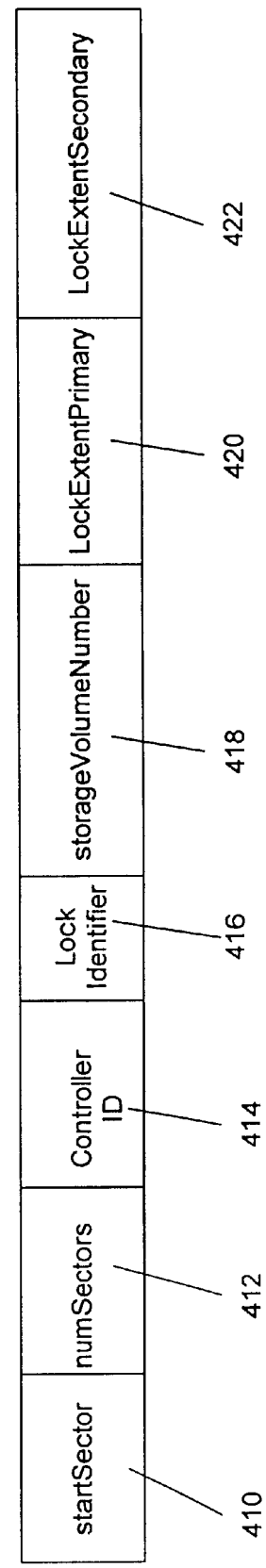
FIG. 4 illustrates the Lock Request Data Structure (LRDS)

FIG. 4 illustrates the Lock Request Data Structure (LRDS) 400. The LRDS 400 is a data structure that is sent as a message to another controller in order to establish a lock on a storage volume. The LRDS data structure includes a parameter identifying the starting sector for this lock region (startSector) 410, a parameter identifying the number of sectors to force to disk and invalidate (numSectors) 412, a parameter that provides a unique identifier to allow other controllers which received the lock requests to determine who made the request (Controller ID) 414, a parameter used to uniquely identify which lock is being serviced (lockIdentifier) 416 which also helps to keep track of a lock to a sequence number rather than having to determine which lock is being handled through the Extent parameter. It also includes a parameter that identifies the storage volume for which the lock is being requested (storageVolumeNumber) 418, a parameter which identifies the type of lock being requested. Recall that the type of lock may be either RESERVATION, FULL, PARTIAL, or BLOCK.

The Primary Lock Request parameter (LockExtent primary) 420 identifies the region of the storage volume which must be flushed before the host requests can be serviced by the requesting controller. The Secondary Lock Request parameter (LockExtent secondary) 422 identifies the region of the storage volume which needs to be flushed before the lock can be coalesced with another lock (such as with a previously established partial lock) or before the entire data extent of the storage volume can be locked.

The Storage Volume Ownership Response is a message that is sent in response to a Storage Volume Ownership Request message. The responses is always sent for every request received. The message contains data fields which pass back of the status of the request and the transaction value. The status of the request can be either "granted" or "rejected". The transaction value is used by the sender to track responses to their corresponding requests. The transaction value is copied from the received request.

Figure 5:
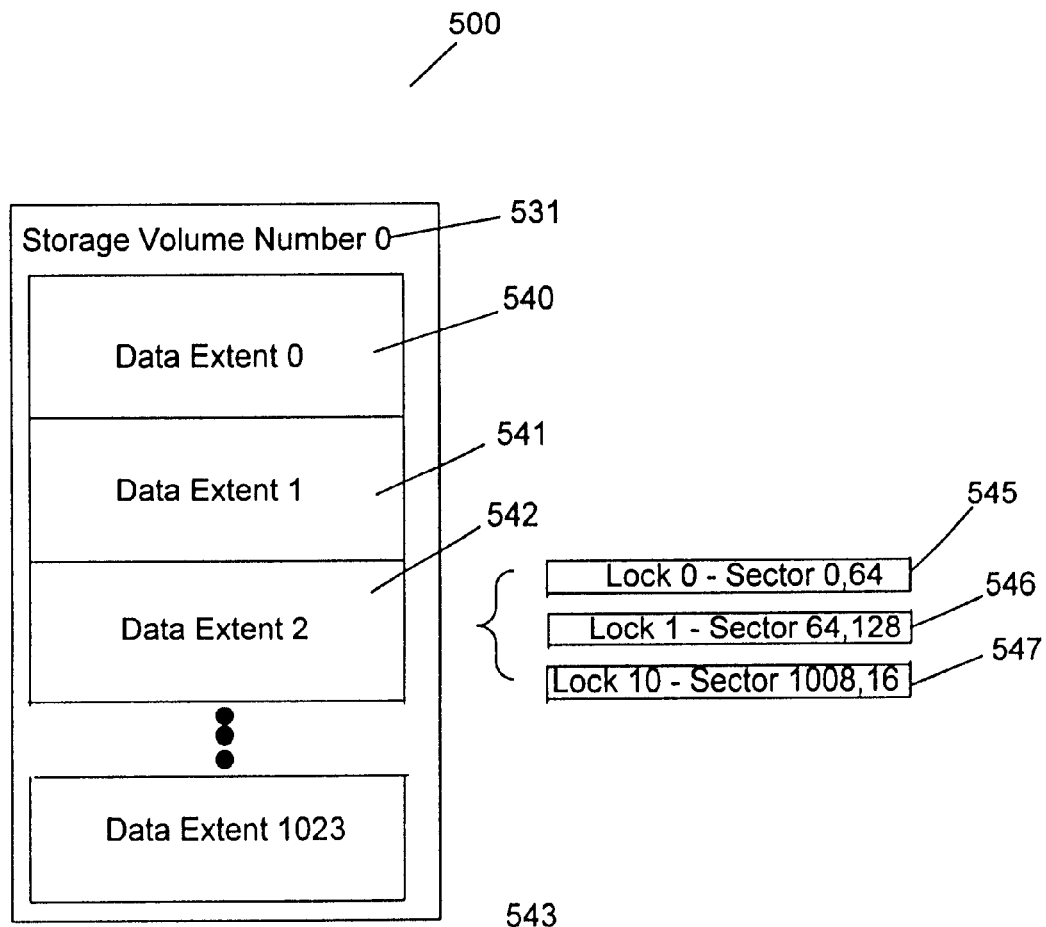
FIG. 5 illustrates an embodiment of a storage volume of the current invention.

FIG. 5 illustrates an embodiment of a storage volume 500 of the current invention. Advantageously, a user configuration tool (such as, for example the Global Array Manager configuration tool made by Mylex Corporation) is used during controller initialization to create the storage volume or volumes. Such an interactive process advantageously permits the user to create the appropriate size storage volume with desired redundancy attributes. Preferably, every storage volume 500 is assigned a unique number and all host accesses use that storage volume number to perform I/O operations, such as for example read and write operations (reads and writes).

In the embodiment illustrated in FIG. 5, the storage volume is assigned number zero ("0") 531. This storage volume has a total size of 512 MB which is broken up into 1024 data extents 540, 541, 542, 543, each extent holding 1024 sectors, with each sector having 512 bytes. Those workers having ordinary skill in the art will appreciate that the storage volume embodiment as described herein are exemplary and that storage volume having a different total size and/or broken up into a different and number of data extents, sectors, and bytes may be used in conjunction with the inventive structure and method. The embodiment in FIG. 5 also illustrates an exemplary structure for the second data extent 542 having three outstanding locks 545, 546, 547. The first lock (lock 0) 545 is locking the first 64 blocks starting at sector 0. This is indicated by the notation "Lock 0—Sector 0,64". The second lock (Block 1) is locking 128 blocks starting at sector 64. The last lock (Lock 10) is locking the last 16 blocks.

Figure 6:
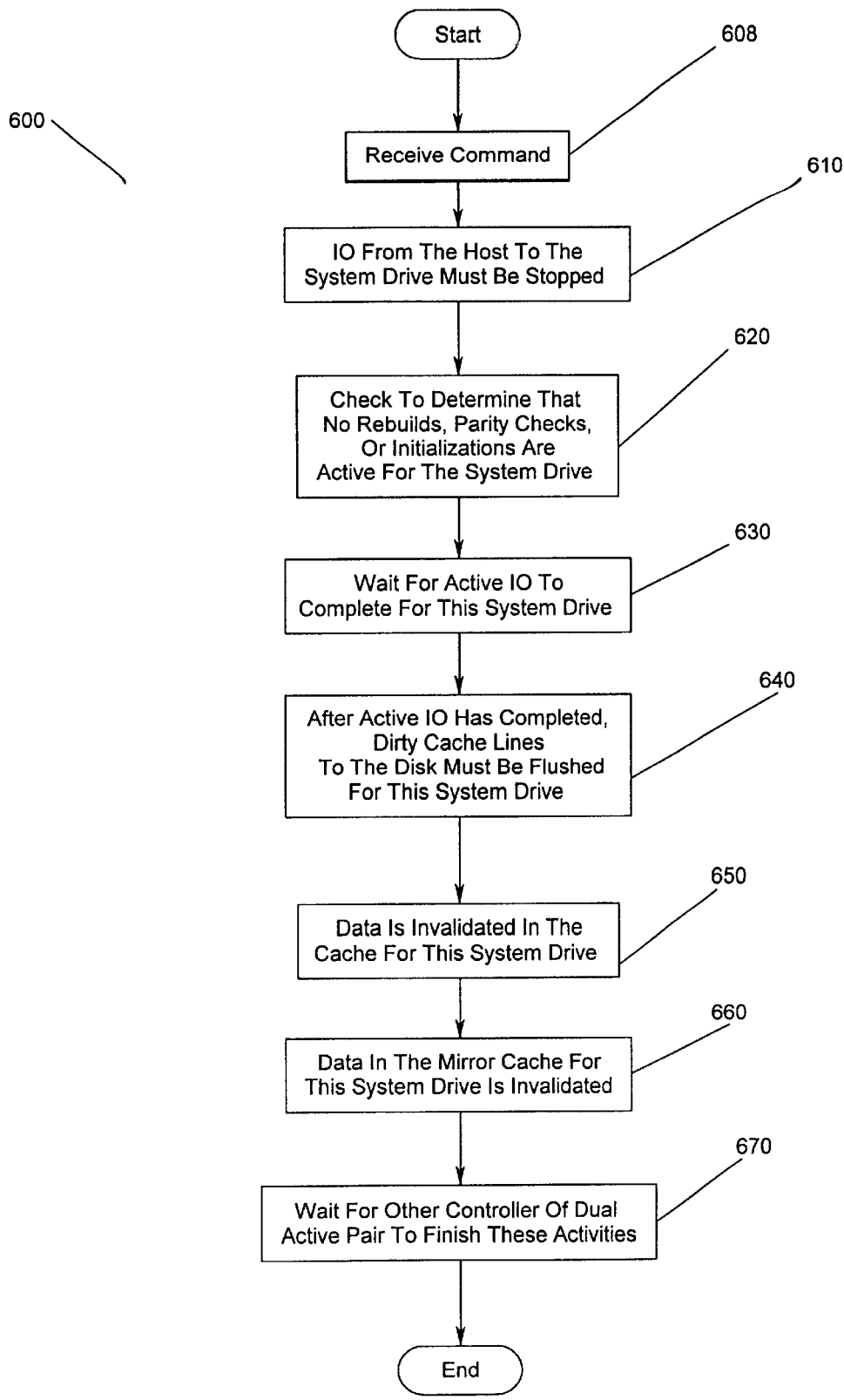
FIG. 6 illustrates a flow chart of the process for quiescing a system storage device.

FIG. 6 illustrates a flow chart 600 of the process for quiescing a system storage device. A system storage device quiesce is the process of stopping activity for a given system storage device and release resources used by the system storage device. First, a command is received 608. To perform a quiesce on both controllers of a dual active pair while maintaining data integrity, IO from the host to the system storage device is held off by the firmware. Busy status is returned for IO 610. Next, a check to determine that no rebuilds, parity checks, or initializations are active for the system storage device is performed 620. If any such activity is active, the quiesce cannot be performed and busy is dropped. The firmware must then wait for active IO to complete for this system storage device 630. After active IO has completed, dirty cache lines to the disk must be flushed for this system storage device 640. Next, data is invalidated in the cache for this system storage device 650. Data in the mirror cache for this system storage device is also invalidated 660. Then, the firmware must wait for other controller of dual active pair to finish these activities 670. Other system storage devices are allowed to continue to process IO.

However, as mentioned above, determining how to find and flush dirty cache data belonging to a specific system storage device presents a problem. Up to now, cache is scanned to look for any link that is associated with the given system storage device and identified lines are scheduled for flushing. Then, the quiesce mechanism must scan again to see if the flush has completed. This process is continued until dirty cache data belonging to the storage device is flushed. Pseudo code for the prior method of determining how to find and flush dirty cache data belonging to a specific system storage device is provided below in Table I.

TABLE I

Schedule Flush
FOR first cache line descriptor TO last cache line descriptor
    DO if dirty cache line belongs to system storage device
        THEN flush
DONE
Poll for Flush completion
DO FOR first cache line descriptor TO last cache line descriptor
    DO if dirty cache line belongs to system storage device
        THEN SLEEP / GOTO Poll start
DONE Still, this approach requires a large amount of time to scan a large cache because there may be thousands of cache lines. A quiesce of a system storage device must be able to be initiated and finished during a vendor unique command processor.

According to the present invention, the stripe lock mechanism is used to find and flush cache data associated with the given system storage device. Dirty cache lines are associated with a stripe lock, as part of normal stripe lock processes. The stripe lock that has dirty code lines attached will be in the active state or the clearing state. The stripe locks are also maintained on a linked list per a system storage device. In the normal life cycle of a stripe lock, if the partner controller requests a lock over part of the extent of an active lock, the active lock will go to the clearing state. This causes data in the extent of the now clearing lock to be flushed. For performing a quiesce, all stripe locks for the given system storage device are set to clearing on both controllers, thus causing the flush. The quiesce mechanism then only needs to wait until all stripe locks have been cleared for the system storage device.

Pseudo code for a method according to the present invention for determining how to find and flush dirty cache data belonging to a specific system storage device is provided below in Table II.

TABLE II

Figure 7:
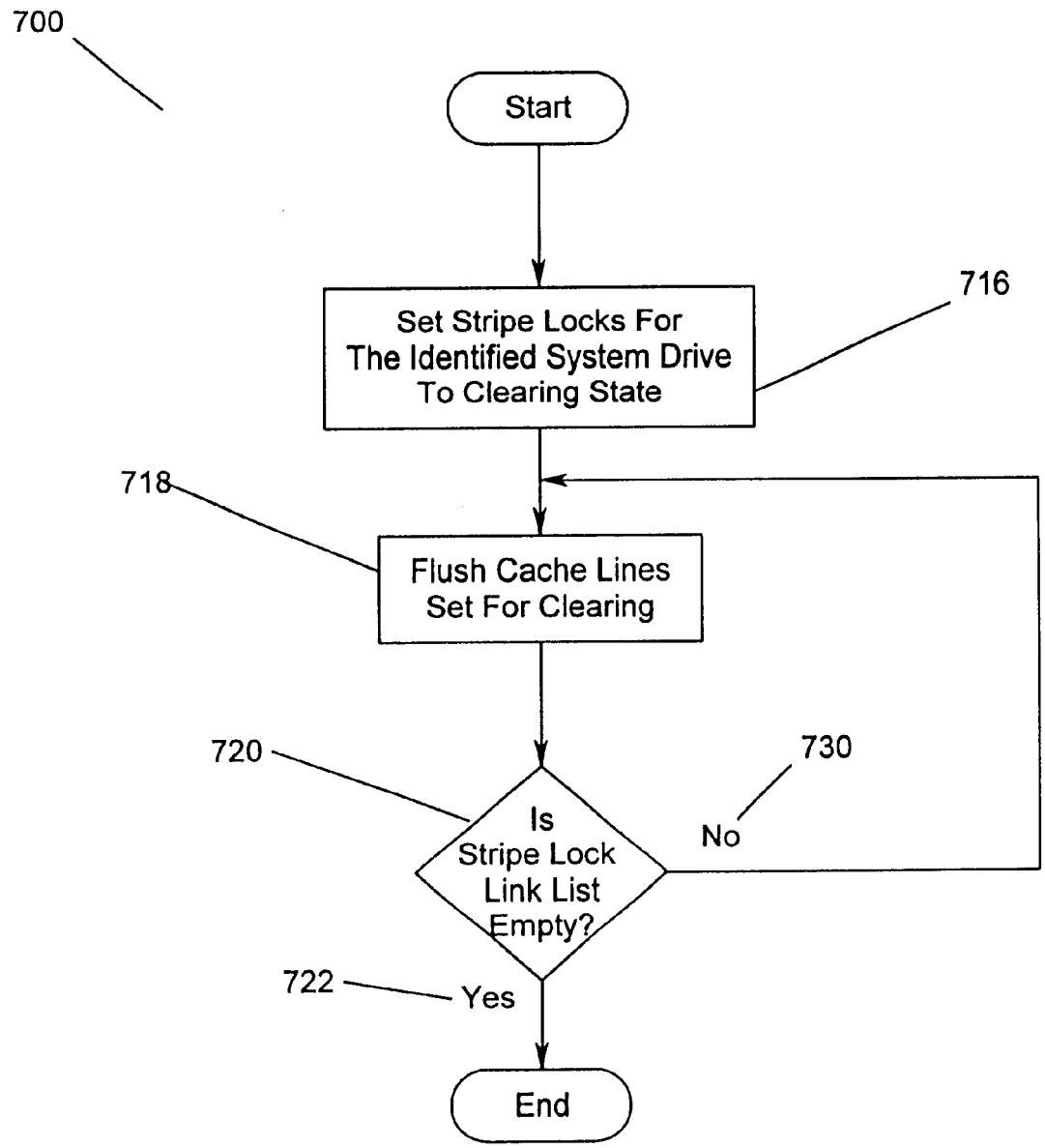
FIG. 7 illustrates a flow chart of the process for determining how to find and flush dirty cache data belonging to a specific system storage device according to the present invention.

Schedule Flush
WHILE NOT at end of stripe lock linked list for system storage device
    DO change state to "clearing"
DONE
Poll for Flush completion
IF stripe lock linked list is NOT empty
    DO SLEEP / GOTO Poll start
DONE FIG. 7 illustrates a flow chart 700 of the process for determining how to find and flush dirty cache data belonging to a specific system storage device. In FIG. 7, stripe locks for the identified system storage device are set to a clearing state 716. All cache lines set for clearing are then flushed 716. The system polls to determine whether all cache lines associated with the identified system storage device have been flushed 720. If yes 722, the process for finding and flushing dirty cache data belonging to a specific system storage device is completed. If not 730, the process repeats until the stripe lock linked list is empty.

Accordingly, the present invention efficiently flushes the dirty cache lines belonging to a specific system storage device without having to loop over all cache lines in cache to discover if the flush has completed on the given system storage device.

Exemplary embodiments have been described with reference to specific configurations. Those skilled in the art will appreciate that various changes and modifications can be made while remaining within the scope of the claims.

Referring to FIG. 1, the process for quiescing a system storage device is performed either by the controllers 116, 118 or by the host 102. The process, as described above with reference to FIGS. 6–7, may be tangibly embodied in a computer-readable medium or carrier, e.g. one or more of the fixed and/or removable data storage devices 190, or other data storage or data communications devices. The computer program 192 of the storage device 190 may be loaded into controllers 116, 118 or the host 102 for execution. The computer program 192 comprise instructions which, when read and executed by the controllers 116, 118 or the host 102 causes the controllers 116, 118 and host 102 to perform the steps necessary to execute the steps or elements of the present invention as represented in FIGS. 6–7.

Figure 8:
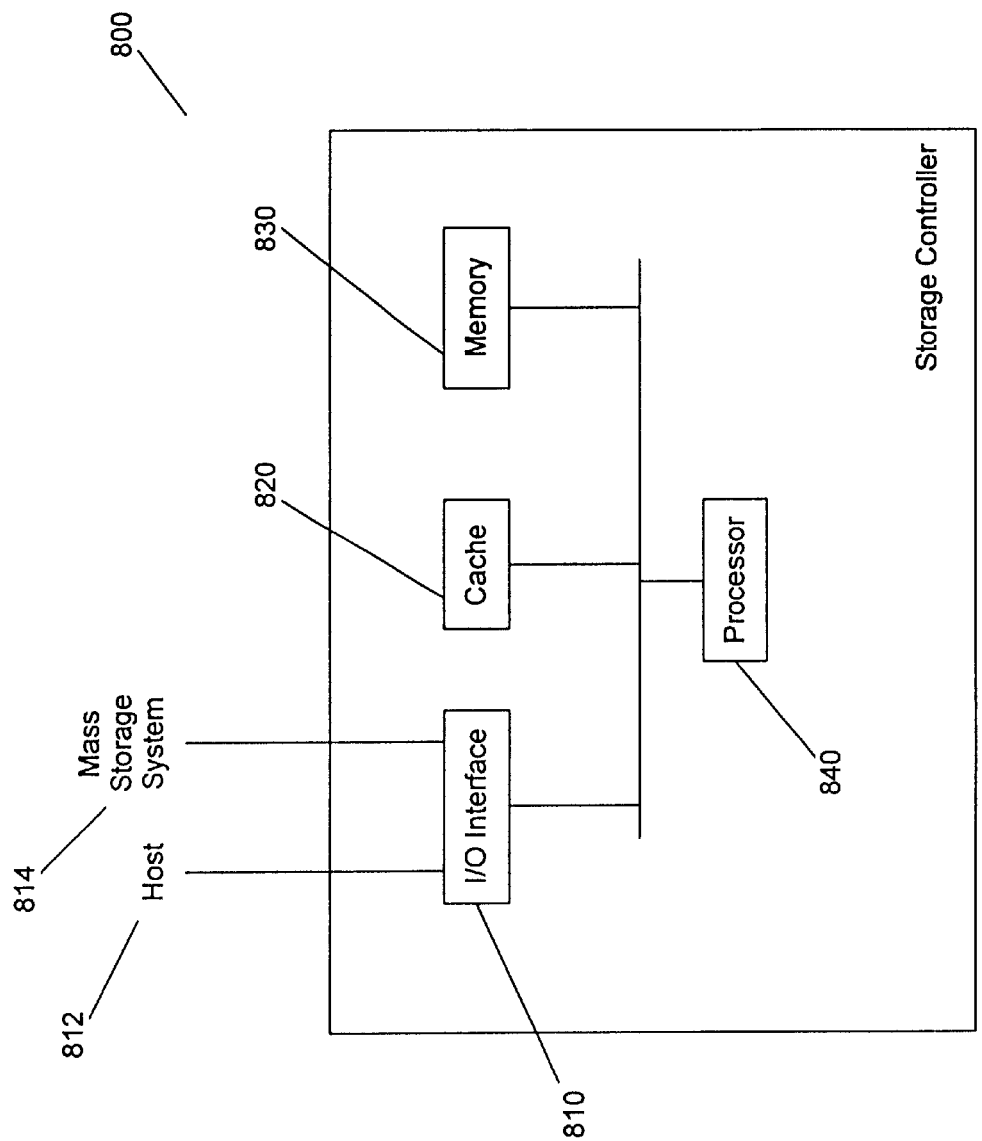
FIG. 8 illustrates a storage controller according to the present invention.

FIG. 8 illustrates a storage controller 800 according to the present invention. The storage controller 800 including an input/output interface 810 for permitting communication with a host computer 812 and a mass storage system 814. The storage controller 800 also includes a cache 820 having a number of cache lines, some of which cache lines may include dirty data and a memory 830 for maintaining a stripe lock. A processor 840 is coupled to the memory and cache. The processor 840 associates dirty cache lines with a stripe lock maintained within the memory 830, wherein the stripe lock represents cache lines within data extents of a system storage device associated with the dirty cache lines. The processor 840 further maintains the stripe locks on a linked list for the system storage device in the memory 830, sets stripe locks for the system storage device to be quiesced to a clearing state and flushes cache lines set for clearing that are associated with the system storage device to be quiesced.

The processor 840 determines whether cache lines associated with the system storage device have been flushed by analyzing whether the stripe lock linked list is empty, halts the system storage device when cache lines associated with the system storage device have been flushed and examines the stripe lock linked list and continues to flush cache lines set for clearing until the stripe lock linked list is cleared. The memory 830 further comprises a plurality of stripe lock records as described above. Alternatively, stripe lock records may be maintain in storage separate from the storage controller, such in the mass storage system 814. The memory 830 further includes a storage volume ownership transaction data structure as described above for tracking transactions with other storage controllers. The memory 930 further comprises a lock request data structure as described above for establishing a lock on a storage volume.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. The foregoing description is not intended to be exhaustive or to limit the invention to the precise form disclosed. Many modifications and variations are possible in light of the above teaching. For example, the particular elements may vary depending on the particular application for the stripe locks while maintaining substantially the same functionality without departing from the scope and spirit of the present invention. In addition, although the preferred embodiment described herein is directed to a data storage system, it will be appreciated by those skilled in the art that the teachings of the present invention can be applied to other data processing systems utilizing system storage devices configured differently than the 4+1 RAID 5 system storage device described herein without departing from the scope and spirit of the present invention. Accordingly, it is intended that the scope of the invention be limited not with this detailed description, but rather by the claims appended hereto.

What is claimed is:

1. A storage system, comprising:

a plurality of caching storage controllers;

a plurality of storage devices coupled to the plurality of storage controllers;

wherein the caching storage controllers are configured to flush cache lines within the storage controllers that are associated with a storage device to be quiesed, the caching storage controllers further;

associates dirty cache lines with a stripe lock within the memory of the caching storage controllers, the stripe lock representing cache lines within data extents of a system storage device associated with the dirty cache lines;

maintains the stripe locks on a linked list for the system storage device;

sets stripe locks for the system storage device to be quiesced to a clearing state; and flushes cache lines set for clearing within the cache storage controllers that are associated with the system storage device to be quiesced; and wherein the memory of the storage controllers further comprises a plurality of stripe lock records; and the stripe lock records comprise an ownership field, a lock type field, an extent field, a use count field, a linked list of pending locks, a linked list of input/output processes (iop)s, a state field, and a lock wait count field.

2. A storage controller, comprising:

an input/output interface for permitting communication with a host computer and a mass storage system;

a cache having a number of cache lines, some of which cache lines may include dirty data;

a memory for maintaining a stripe lock; and a processor, coupled to the memory and cache, the processor associating dirty cache lines with the stripe lock maintained within the memory, the stripe lock representing cache lines within data extents of a system storage device associated with the dirty cache lines, the processor maintaining the stripe locks on a linked list for the system storage device in the memory, setting stripe locks for the system storage device to be quiesced to a clearing state and flushing cache lines set for clearing that are associated with the system storage device to be quiesced; and wherein the memory further comprises a plurality of stripe lock records; and the stripe lock records comprise an ownership field, a lock field, an extent field, a use count field, a linked list of pending locks, a linked list of input/output processes (iop)s, a state field, and a lock wait count field.

3. A method for updating a storage device, said method comprising the steps of:

before receiving a request to prepare for quiesce of said storage device, a first controller updating a plurality of records to indicate that said first controller has a plurality of locks over a plurality of respective regions in said storage device to enable said first controller to write data to said plurality of regions, and then writing multiple units of data to respective multiple lines in a cache in said first controller, said multiple units of data being addressed to said plurality of regions; and a second controller requesting from said first controller one of said locks so that said second controller can write a unit of data to a respective one of said regions, and in response, said first controller updating one of said records corresponding to said one region to indicate that said first controller can no longer write data to said one region and has a lock to write to said one region the existing data in the cache lines corresponding to said one region, writing to said one region the existing data in the cache lines corresponding to said one region, and afterwards, updating said one record to indicate that said second controller has a lock to write data to said one region;

after receiving a request to prepare for quiesce of said storage device, identifying regions contained within said storage device, referencing said plurality of records to identify which of said identified regions are locked by said first controller to write to said identified regions, and then referencing said cache to identify lines in said cache that are addressed to said identified regions, and then updating the corresponding records to indicate that said first controller can no longer write data to said identified regions and can write to said identified regions the existing data in the cache lines corresponding to said identified regions, and then writing data in said identified lines to said identified regions.

4. A system for updating a storage device, said system comprising:

before receiving a request to prepare for quiesce of said storage device, means within a first controller for updating a plurality of records to indicate that said first controller has a plurality of locks over a plurality of respective regions in said storage device to enable said first controller to write data to said plurality of regions and then write multiple units of data to respective multiple lines in a cache in said first controller, said multiple units of data being addressed to said plurality of regions; and means within a second controller for requesting from said first controller one of said locks so that said second controller can write a unit of data to a respective one of said regions, and in response, means within said first controller for updating one of said records corresponding to said one region to indicate that said first controller can no longer write data to said one region and has a lock to write to said one region the existing data in the cache lines corresponding to said one region, writing to said one region the existing data in the cache lines corresponding to said one region, and afterwards, updating said one record to indicate that said second controller has a lock to write data to said one region;

after receiving a request to prepare for quiesce of said storage device, means within said first controller for identifying regions contained within said storage device, referencing said plurality of records to identify which of said identified regions are locked by said first controller to write to said identified regions, and then referencing said cache to identify lines in said cache that are addressed to said identified regions, and then updating the corresponding records to indicate that said first controller can no longer write data to said identified regions and can write to said identified regions the existing data in the cache lines corresponding to said identified regions, and then causing said first controller to write data in said identified lines to said identified region.

* * * * *